United States Patent
Clifton et al.

(10) Patent No.: US 9,213,426 B2
(45) Date of Patent: Dec. 15, 2015

(54) REENABLE DELAY OF A TOUCHPAD OR TOUCH SCREEN TO PREVENT ERRONEOUS INPUT WHEN TYPING

(75) Inventors: Trevor C. Clifton, Lehi, UT (US); David Taylor, West Jordan, UT (US); Vadim Klishko, Layton, UT (US); Richard D. Woolley, Orem, UT (US); Dale J. Carter, Orem, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 293 days.

(21) Appl. No.: 13/117,038

(22) Filed: May 26, 2011

(65) Prior Publication Data

US 2011/0316774 A1    Dec. 29, 2011

Related U.S. Application Data

(60) Provisional application No. 61/348,505, filed on May 26, 2010.

(51) Int. Cl.
G06F 3/0354    (2013.01)

(52) U.S. Cl.
CPC .................................. *G06F 3/03547* (2013.01)

(58) Field of Classification Search
CPC ... G06F 3/038; G06F 3/0338; G06F 3/03547; G06F 3/0488; G06F 3/04883; G06F 3/04886
USPC ..................................... 345/157, 173, 534, 99
See application file for complete search history.

(56) References Cited

U.S. PATENT DOCUMENTS

| 6,380,929 | B1 | 4/2002 | Platt | |
| 6,574,095 | B2 * | 6/2003 | Suzuki | 361/679.08 |
| 2002/0180704 | A1 | 12/2002 | Rudd | |
| 2005/0057489 | A1 * | 3/2005 | Kung et al. | 345/156 |
| 2006/0267955 | A1 * | 11/2006 | Hino | 345/173 |
| 2007/0091070 | A1 * | 4/2007 | Larsen et al. | 345/168 |
| 2007/0115263 | A1 | 5/2007 | Taylor et al. | |
| 2007/0291009 | A1 * | 12/2007 | Wright et al. | 345/173 |
| 2008/0316183 | A1 * | 12/2008 | Westerman et al. | 345/173 |
| 2009/0244092 | A1 | 10/2009 | Hotelling | |
| 2010/0020025 | A1 * | 1/2010 | Lemort et al. | 345/173 |
| 2010/0149121 | A1 * | 6/2010 | Alexander et al. | 345/173 |
| 2011/0057953 | A1 * | 3/2011 | Horodezky | 345/647 |

* cited by examiner

*Primary Examiner* — Aneeta Yodichkas
(74) *Attorney, Agent, or Firm* — Morriss O'Bryant Compagni, PC

(57) ABSTRACT

A system and method wherein touchpad input including movement of a cursor and mouse clicks are inhibited until two events have occurred, namely, a timeout interval has elapsed and detection of movement of a pointing object a predetermined distance on the touchpad, wherein the system and method may also be implemented in touchpad firmware or hardware so that touchpad functionality beyond functions offered by an Operating System will travel with the touchpad and be available even when a software driver offering extended touchpad functionality is not installed or available for use.

7 Claims, 2 Drawing Sheets ness of the present invention.
REENABLE DELAY OF A TOUCHPAD OR TOUCH SCREEN TO PREVENT ERRONEOUS INPUT WHEN TYPING

BACKGROUND OF THE INVENTION

1. Field of the Invention

This invention relates generally to touchpads. More specifically, the present invention is a method of preventing accidental contact with a touchpad to be interpreted as intended data input, such as when the palm of a hand accidentally rests on a portion of the touchpad when performing other tasks such as typing on a keyboard or moving a touchstick pointer, trackball or mouse.

2. Description of Related Art

There are several designs for capacitance sensitive touchpads. One of the existing touchpad designs that can be modified to work with the present invention is a touchpad made CIRQUE® Corporation. Accordingly, it is useful to examine the underlying technology to better understand how any capacitance sensitive touchpad can be modified to work with the present invention.

The CIRQU® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will, enable the present invention to function.

It should be understood that a touchpad is defined as a touch sensitive surface, thus any touch sensitive surface such as a touchscreens should be considered to fall within the scope of the present invention. Accordingly, any touch sensitive surface will be referred to hereinafter as a touchpad, but should be considered to include any type of touch sensitive surface using any type of touch input technology, and should not be considered to be limited to mutual capacitance technology.

Using a touchpad in certain environments can be difficult because of the location of a touchpad within a computing device. For example, in a laptop or other portable computing device, a touchpad is often placed just in front of a keyboard. When a user is typing, the thumb or the palm of the hand just below the thumb can easily brush against a portion of the touchpad. This inadvertent contact with the touchpad can be misinterpreted as intentional input to the portable computing device. Unintended data input includes deselecting an item such as an icon shown on a graphical user interface, a mouse button click, or movement of the cursor. Accidental mouse button clicks are especially inconvenient because they may result in unwanted repositioning of a text insertion point, which can cause typed text to appear in the wrong place.

To remedy this problem, some software drivers for touchpads implement a feature where all input from the touchpad is inhibited while keystrokes are being detected. When a certain time interval (timeout) has elapsed after the last detected keystroke, input resumes.

The solution described above of using a timeout interval has a problem. If the timeout interval is too short, unwanted input from a touchpad can still occur if the user pauses for a short time while typing and then brushes against the touchpad before resuming typing. In addition, if the timeout interval is too long, then the user has to wait for an inconveniently long period of time before being able to resume touchpad input.

Another problem associated with unintended touchpad input is that the timeout solution is typically provided in the driver software. However, if a customized touchpad driver is not available or installed, then the ability of the touchpad to avoid unintended input is prevented or limited.

Accordingly, it would be an improvement over the prior art to provide a system and method for preventing unintended touchpad input caused by accidental contact with a touchpad surface by a palm, thumb or finger. It would be a further improvement to provide such improvements to touchpad performance regardless of whether or not a software driver is installed or available.

BRIEF SUMMARY OF THE INVENTION

In a first embodiment of the present invention the system and method, touchpad input including movement of a cursor and mouse clicks are inhibited by the touchpad until two events have occurred, namely, a timeout interval clock has elapsed and detection of movement of a pointing object a predetermined distance on the touchpad, wherein the system and method may also be implemented in touchpad firmware or hardware so that touchpad functionality beyond functions offered by an Operating System will travel with the touchpad and be available even when a software driver offering extended touchpad functionality is not installed or available for use.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
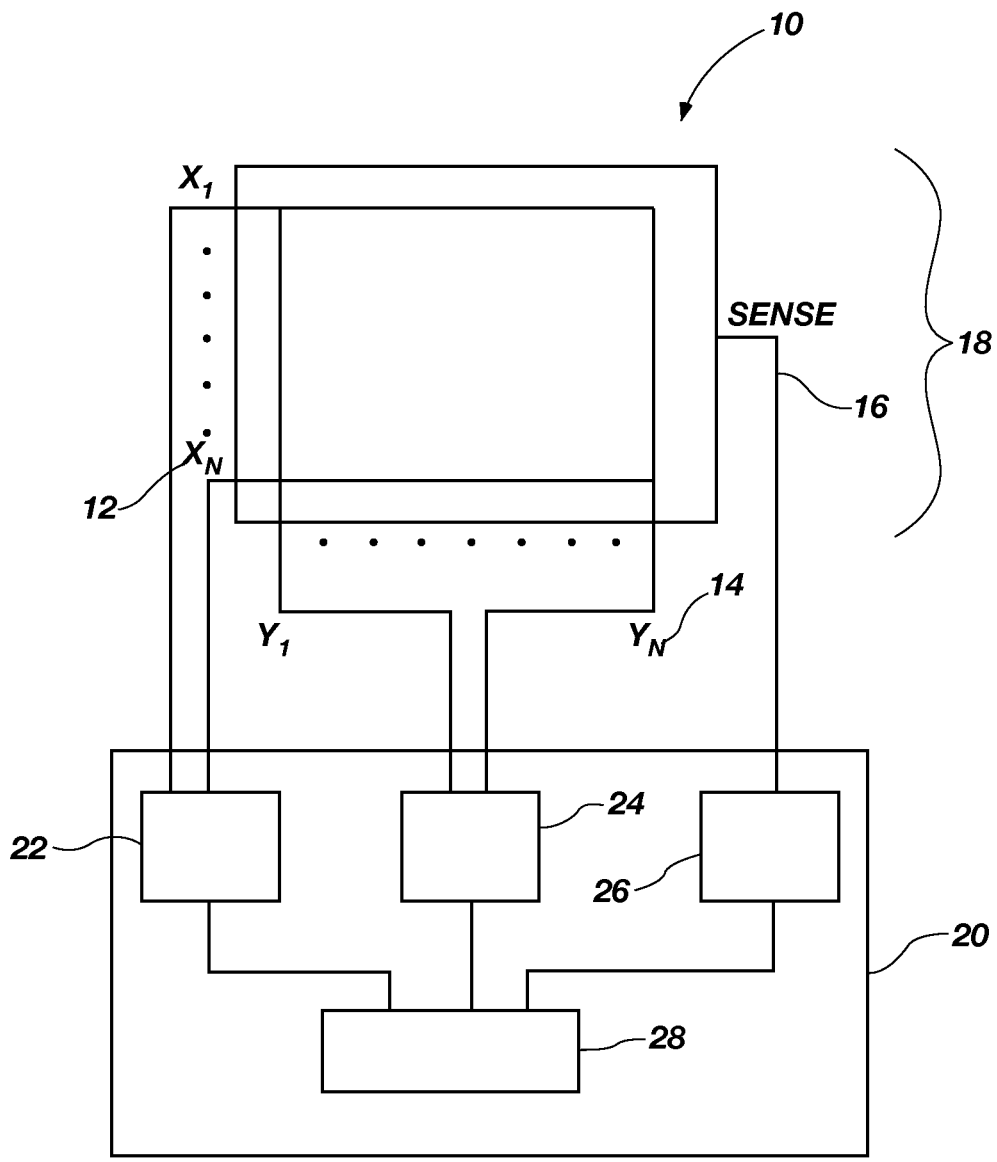
FIG. 1 is a block, diagram of operation of a first embodiment of a touchpad that is found in the prior art, and which is adaptable for use in the present invention.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Using a touchpad in certain environments can be difficult because of the location of a touchpad within a computing device. In a laptop or other portable computing device, a touchpad is often placed in front of a keyboard where a user is likely to rest the thumbs or palms while typing or using the touchpad. When a user is typing, the thumb or the palm of the hand just below the thumb can easily brush against a portion of the touchpad. This contact with the touchpad can often be misinterpreted as intentional, causing unintended data input to the portable computing device.

Prior art solutions are directed to only using a timeout interval when input to the touchpad is ignored for a period of time while typing. The problem is in selecting an appropriate timeout interval that is neither too short nor too long. If the selected timeout interval is too long, the user must wait to use the touchpad after typing. However, if the timeout interval is too short, the user can still cause unintentional data input.

The other problem that the present invention is directed to is the type of input that can be done. Specifically, after typing, a user will typically use the touchpad to either move a cursor on a graphical user interface, or tap the touchpad for a mouse click or button input. Therefore two different strategies are taught by the present invention.

The reason for providing different strategies is that the touchpad must not be designed so that the user will consider it to be unresponsive. Therefore, the present invention tries to strike a balance between usability or responsiveness, and protection from unwanted input.

A tapping function is more of a problem because a tap on the touchpad can cause more unwanted actions than a moving a cursor. Accordingly, a first embodiment of the present invention is used when a user wants to tap on the touchpad. The first embodiment is to make two events take place before touchpad tapping input is allowed to resume. Specifically, a timeout interval clock or "timeout interval" is combined with the tracking of total movement of a finger. By combining a timeout interval with another action, a shorter timeout interval is used in comparison to a touchpad that only relies on a timeout delay to prevent unintended input.

What is meant by a "shorter" timeout interval is a relative measure of time. For the purposes of the present invention, a typical "short" timeout interval is approximately 400 milliseconds. However, this timeout interval is adjustable by the user in case it is considered too long or short, so should not be considered as limiting. Nevertheless, a "short" timeout interval should be considered as 400 millisecond, give or Lake 50 milliseconds.

As for the movement that is required by this first embodiment, the total path length that is traveled is considered to be the "movement" that the finger has traveled, and not just finger displacement. In other words, the user could move a finger in a circle and therefore the displacement is zero, but the path length would be the circumference of the circle.

The reason for requiring movement, when the user wants to perform a tap is that it is likely that the user is moving a text insertion point to a new location in a document or dialog box, and movement will be required.

The path length that is required by the present invention can be absolute or relative to the size of the surface of the touchpad. If absolute, the path length can be set to any desired distance that is likely to be sufficient to show that a user will want to perform a tap. This distance is configurable, but may be considered to be around 5 to 10 millimeters, but can be changed as desired.

When the path length is going to be a relative distance, it is considered to be relative to the total width of the touchpad. In this first embodiment, the path length is typically $1/20^{th}$ of the total touchpad width. Again, this value can be modified by the user to conform to different preferences.

Another way to calculate path length is in terms of counts. A touchpad can be defined by the number of counts or positions that an object can be considered to be located on the touchpad. The path length is thus 100 counts out of a total of 2000 counts in this embodiment. It is observed that a touchpad has the same number of total counts no matter how large its' physical size. So a touchpad that is two inches wide has as many counts across it as a touchpad that is five inches wide, as long as they are using the same number of drive and sense electrodes.

In this first embodiment, by requiring a specific action by the user along with (and at the same time as) timeout interval, a timeout interval that may be too short will still not allow unintended input by itself.

Therefore, the first embodiment requires that not only does the timeout interval expire, but also movement of a finger (or thumb) a predetermined path length on the touchpad. The starting of the timeout interval is triggered by lifting the finger from a key, or key-up. Alternatively, the even that starts the timeout interval can be can touchdown of a finger on the touchpad.

After a finger has traveled a predetermined path length on the touchpad, and the timeout interval has also elapsed, then it will be assumed that this tapping by the finger on the touchpad is intentional, and only then will the touchpad be enabled to allow data input from a tapping action.

In an alternative embodiment to requiring movement of a finger, a longer timeout interval may be used. This "long" timeout interval would typically be two seconds, but again, this timeout interval may be configured by the user according to user preferences.

The second scenario is the situation where only cursor movement is desired. Cursor movement is considered as less of a threat of unintended movement because cursor movement by itself does not cause unwanted lumps of an insertion point, for example, in a document that is being typed. This is simply a function of a word processing program or the Operating System. Therefore the insertion point should not be bothered by movement of the cursor. The cursor is often hidden when there is typing, and only reappears after the cursor is moved.

Therefore, if the desired action is only cursor movement, in a second embodiment of the present invention, movement of a finger is not required. The short timeout interval will typically be used.

The last remaining issue has to do with the scenario when movement of a finger along a path length is required along with the expiration of the timeout interval. While the starting point for counting the timeout interval is triggered by the key-up action, there is an issue as to whether or not the user must finish the movement on the touchpad before the timeout interval has expired.

Figure 2:
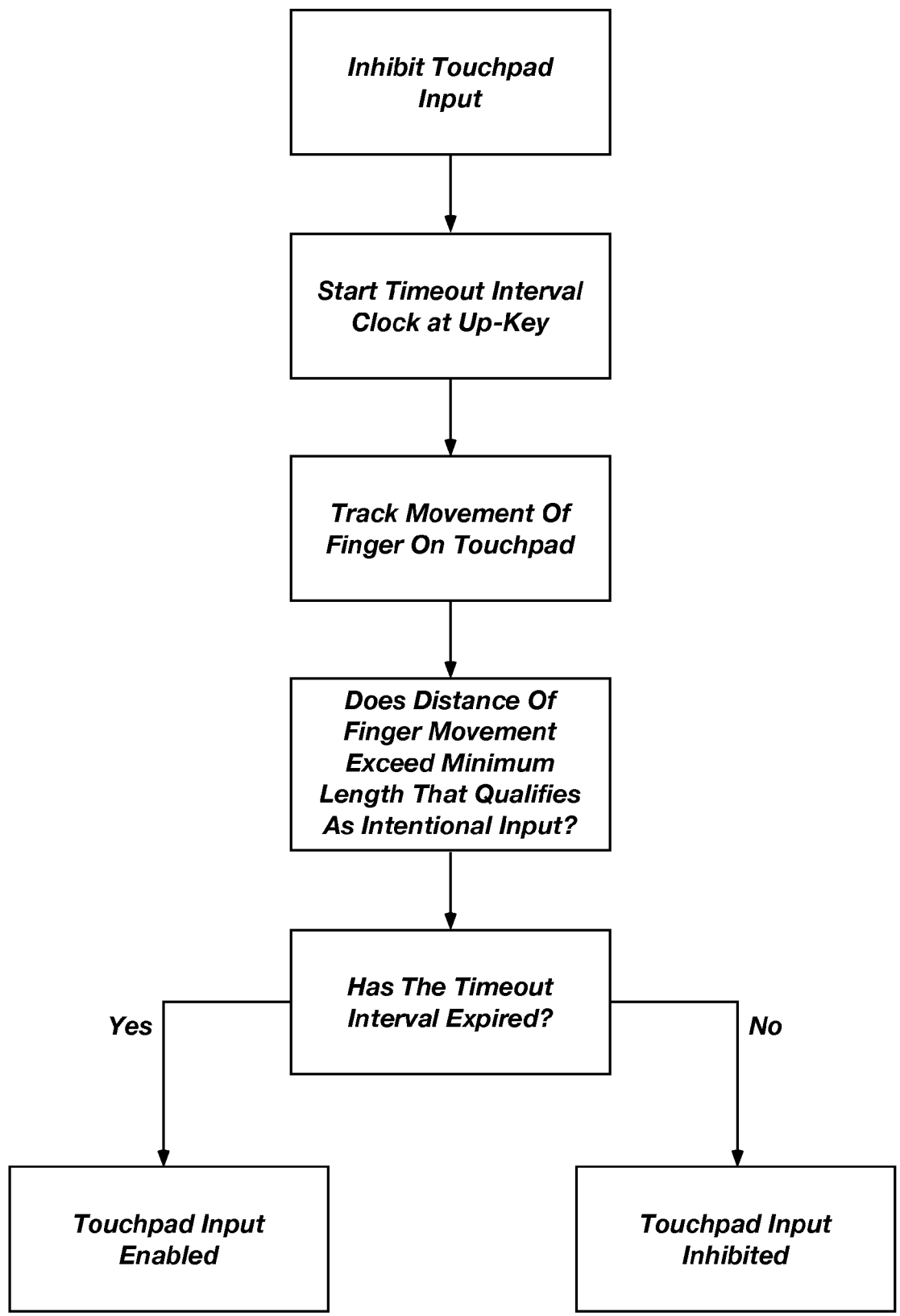
FIG. 2 is a flowchart showing how to implement the first embodiment of the present invention that requires a timeout interval no elapse and movement of a finger for a predetermined path length before touchpad input is re-enabled for a tap input to be allowed.

FIG. 2 shows that the first embodiment combines a timeout interval with finger movement that could be completed by the user before or after the timeout interval has elapsed. What is important is that both actions have occurred. Thus, the user simply has to complete both tasks, movement along a predetermined path length with a finger on the touchpad, and the timeout interval from last key-up event must be expired.

in an alternative embodiment, the user is required to make touchdown of a finger on the touchpad before the timeout interval clock has expired.

What must also be remembered is that FIG. 2 shows the steps for a tapping input to be accepted by the touchpad, not cursor movement. For cursor movement, only the "short" timeout interval must be completed.

It is noted that finger movement can be distinguished from movement of a palm across the touchpad because of the much larger surface area that is covered by contact by the palm or portion of a palm of a hand. Thus, contact with and movement by the palm of the hand will not be interpreted by the system as enabling the touchpad input. Furthermore, because a specific path length must be traveled by the finger, it is also unlikely that a quick brushing movement on the touchpad by a thumb (or even a finger) would cause activation of touchpad input either.

Regarding the calculation of path length, in a first embodiment for calculating distance, the distance is calculated as a cumulative value of minute Euclidean (2-norm) distances traveled over individual packets of mouse data. In an alternative embodiment, the distance may be calculated as a cumulative value of minute Manhattan (1-norm) distances traveled over individual packets of mouse data. In another alternative embodiment, the distance may be calculated as a cumulative value of minute Chebyshev (infinity-norm) distances traveled over individual packets of mouse data. In another alternative embodiment, the distance traveled by the finger is calculated independently for each coordinate, and then the greater value is taken for the result. In another embodiment, displacement alone is used, and the distance between touchdown and liftoff of the finger could be used.

What should be understood is that there are various methods, including other methods not described herein, which can be used to determine the distance traveled by the finger in order to activate the touchpad input mode. All of these methods should be considered to be within the scope of this invention.

The concept of inhibiting touchpad input until a timeout interval has elapsed and a finger has traveled a sufficient distance on the touchpad can be provided in a software driver. However, touchpads are not always used in environments where a software driver is allowed to be installed, or the software driver is unavailable. In other situations, the software driver is simply not installed by the user by choice, and in all these situations, the touchpad only provides the features that are provided by the Operating System. When a touchpad is implemented using only those features that are provided in an Operating System, the functionality is typically severely limited because an Operating System is designed to provide only basic functions that should be provided by all touchpad input devices. The improvements, that may be referred to as "extended touchpad functionality", that can be offered with customized software that are beyond basic functionality are then left to the provider of the touchpad.

Therefore, in another embodiment of the present invention, the extended touchpad functionality of a touchpad can now be guaranteed. Extended functions of the touchpad can be implemented not only in a software driver, but also in firmware and hardware of the touchpad. By implementing in firmware or hardware, the extended functionality of the touchpad can move with the touchpad itself, and not be dependent upon a software drive being installed. If a software drive is installed, the touchpad firmware or hardware can be designed to not conflict with the software driver.

The extended touchpad functionality can be stored in code that is stored in memory on a touchpad circuit board, or hard-wired in the touchpad circuit board itself. Implementing in firmware enables the extended touchpad functionality to be modified or updated as desired. What is important in the present invention is that the extended touchpad functionality be a part of the touchpad itself, and not reliant on installation of a software driver.

In another alternative embodiment of the present invention, the touchpad can use information that can be provided by the EC or the BIOS. The EC or the BIOS can provide information regarding keyboard presses. Keyboard presses or "keydown" data can then be used to determine what action the touchpad should allow and what action should be inhibited.

For example, four different touchpad actions have been identified that can all use "large palm bit" data or information from the EC or the BIOS. A large palm bit is set when the touchpad detects an unexpectedly large object. In a first action, the extended functionality can be provided at an ASIC level. In this case, a large palm bit can be set to indicate when a single object too big to be a finger is detected and the finger count is less than 2. When the large palm bit is set in this first case, cursor movement is frozen.

In an alternative embodiment, when the large palm bit is set, cursor movement is allowed, but a tap action such as a mouse click is inhibited.

In another alternative embodiment, a keypress or key down is detected from the laptop SC or BIOS level. All taps on the touchpad are then inhibited (filtered) until a predetermined timeout interval has elapsed. However, if another key down event occurs before the timeout interval has elapsed, then the timeout interval is reset, and taps are again inhibited until the new timeout interval has elapsed. The timeout interval countdown is reset as often as needed until it expires and the touchpad is fully active.

In a last embodiment, a keypress or key down is detected from the laptop EC or BIOS level, but cursor movement is filtered until there is also some significant detection of movement of a finger within or that begins within a predetermined timeout interval.

It is envisioned that the embodiments above may be modified as needed in order to achieve the desired extended touchpad functionality and minimize accidental touchpad input. It is envisioned that the user would be able to modify settings to control sensitivity of these filtering features.

The extended touchpad functionality, including the ability to minimize accidental touchpad input, would be available for use by the touchpad regardless of the environment or Operating System in which the touchpad is being used. Accordingly, any software driver could be active at the same time that these extended touchpad functions are also available. The extended touchpad functionality features would then be provided in addition to any features provided by the software driver. In an alternative embodiment, the extended touchpad functionality provided by the touchpad could override functions that a software driver wants to provide, or the software driver could override functions being provided by the touchpad in firmware or hardware.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for preventing unintended data input on a touchpad when typing on a keyboard that is separate from the touchpad, said method comprising the steps of:
   1) inhibiting touchpad input when typing is occurring on a keyboard that is separate from the touchpad;
   2) starting a timeout interval clock at last key-up event on the keyboard;
   3) detecting touchdown of a finger on the touchpad and tracking total path length that the finger is traveling; and
   4) enabling touchpad tap input if the timeout interval clock has expired and total path length exceeds a predetermined path length value, if no new key-down event has occurred.

2. The method as defined in claim 1 wherein the method further comprises the step of determining the total path length as an absolute distance.

3. The method as defined in claim 1 wherein the method further comprises the step of determining the total path length as relative to a position count of the touchpad.

4. The method as defined in claim 3 wherein the method further comprises the step of determining the total path length as a percentage of the position count.

5. The method as defined in claim 1 wherein the method further comprises the step of making the timeout interval clock adjustable.

6. The method as defined in claim 5 wherein the method further comprises the step of using a time period of 350 milliseconds to 450 milliseconds for the timeout interval clock.

7. The method as defined in claim 1 wherein the method further comprises the step of requiring touchdown on the touchpad occurs before the timeout interval clock has expired.

* * * * *